US012798416B2

(12) United States Patent
Lannetoft et al.

(10) Patent No.: US 12,798,416 B2
(45) Date of Patent: Nov. 17, 2026

(54) COMMUNICATIONS MODULE, A COMMUNICATIONS SYSTEM AND A MARINE VESSEL

(71) Applicant: VOLVO PENTA CORPORATION, Gothenburg (SE)

(72) Inventors: Simon Lannetoft, Trollhättan (SE); Gabriel Hultman Ericson, Gothenburg (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 34 days.

(21) Appl. No.: 18/987,951

(22) Filed: Dec. 19, 2024

(65) Prior Publication Data

US 2025/0214466 A1 Jul. 3, 2025

(30) Foreign Application Priority Data

Dec. 29, 2023 (EP) .................................... 23220821

(51) Int. Cl.
*B60L 53/30* (2019.01)
*B60L 53/62* (2019.01)
*B63B 27/30* (2006.01)

(52) U.S. Cl.
CPC ............... *B60L 53/30* (2019.02); *B60L 53/62* (2019.02); *B63B 27/30* (2013.01); *B60L 2200/32* (2013.01)

(58) Field of Classification Search
None
See application file for complete search history.

(56) References Cited

U.S. PATENT DOCUMENTS

| | | | | |
|---|---|---|---|---|
| 5,510,659 | A | 4/1996 | Lewis et al. | |
| 11,611,226 | B1 | 3/2023 | Shaffer et al. | |
| 2019/0106000 | A1* | 4/2019 | Heyne | B60L 53/20 |
| 2020/0282853 | A1* | 9/2020 | Paryani | B60L 53/22 |
| 2023/0027633 | A1 | 1/2023 | Neligan et al. | |
| 2024/0097453 | A1* | 3/2024 | Williams | H02M 7/797 |
| 2025/0083563 | A1* | 3/2025 | Venkatesan | B60L 53/16 |

FOREIGN PATENT DOCUMENTS

| | | | | |
|---|---|---|---|---|
| CN | 112339585 | A * | 2/2021 | B60L 53/35 |

OTHER PUBLICATIONS

Extended European Search Report dated Jun. 6, 2024 in corresponding European Patent Application No. 23220821.5, 9 pages.

* cited by examiner

*Primary Examiner* — Justin S Lee
(74) *Attorney, Agent, or Firm* — Jeffri A. Kaminski; Venable LLP

(57) ABSTRACT

An on-board communications module configured to enable charging of a propulsion electric energy storage system of a marine vessel using an on-shore combined charging system. The marine vessel has a corrosion protection arrangement, the communications module to galvanically isolate a charging control unit of the marine vessel from a DC electric energy storage system of the marine vessel, the communications module further being configured to galvanically isolate the charging control unit from low-voltage consumers of the marine vessel.

10 Claims, 4 Drawing Sheets

COMMUNICATIONS MODULE, A COMMUNICATIONS SYSTEM AND A MARINE VESSEL

TECHNICAL FIELD

The disclosure relates generally to charging of marine vessels having an electric or a hybrid electric driveline. In particular aspects, the disclosure relates to charging of such a marine vessel using a combined charging system (CCS) and which vessel is further provided with a conventional corrosion protection arrangement. Although the disclosure may be described with respect to a marine vessel, the disclosure is not restricted to any particular vessel.

BACKGROUND

A combined charging system (CCS) is a standard for charging electric vehicles, especially land vehicles. Communication signals are used to control charging using a CCS. A charging interface between a charger and the vehicle to be charged comprises a number of communication lines for monitoring and controlling the charging procedure.

The communication lines comprise at least a control pilot (CP) line, a proximity pilot (PP) line and a protective earth (PE) line. The CP line provides bi-directional communications between the electric vehicle and the charging system. The PP line is used to prevent movement while the electric vehicle is connected to electric vehicle supply equipment (EVSE). The CP line may also check the maximum amount of current that the electric vehicle is able to take at any one time. The PE line is electrically grounded on the EVSE side, which also means that an electric land vehicle is grounded. It is also used as a reference line for CP and PP.

A basic requirement to start charging using a CCS is that the PE signal of the EVSE matches a ground signal received from an electronic control unit of the electric vehicle.

In marine applications, problems arise when a marine vessel is connected to an on-shore charging station. A hull of a marine vessel is often metallic and is electrically grounded to water surrounding the vessel. When the vessel is electrically connected to the on-shore charging station, a potential difference is generated between the different metals of the hull and the electric lines of the charging station. The water acts as an electrolyte, generating an electric stray current which in turn causes corrosion to the marine vessel. Marine vessels are therefore conventionally equipped with different kinds of corrosion protection arrangements to prevent stray currents that lead to corrosion. The connection between ground of the charging station and the grounded hull of the marine vessel may be provided with a galvanic isolator or an isolation transformer. Alternatively, a ground connection of a low-voltage DC electric energy storage system, such as a 24V battery, used for powering low-voltage consumers such as control units (ECU) of the marine vessel, is separated from the grounded hull.

There is a striving to introduce the standard of CCS in marine applications. However, when connecting a marine vessel to a CCS, the conventional corrosion protection arrangements mentioned hereinabove will prevent the charging process from starting because the PE signal of the on-shore charging station will differ from the ground signal received from the marine vessel.

SUMMARY

According to a first aspect of the disclosure, an on-board communications module is configured to enable charging of a propulsion electric energy storage system of a marine vessel using an on-shore combined charging system (CCS). The marine vessel comprises a corrosion protection arrangement and the communications module is configured to galvanically isolate a charging control unit of the marine vessel from a DC electric energy storage system of the marine vessel. The communications module is further configured to galvanically isolate the charging control unit from low-voltage consumers of the marine vessel. The first aspect of the disclosure may seek to provide a ground signal of the charging control unit of the marine vessel, which ground signal matches the protective earth (PE) signal of the on-shore combined charging system while at the same time preventing a leak current which could lead to corrosion. In this manner, electric, or hybrid electric marine vessels, equipped with corrosion protection arrangements, will be allowed to charge the propulsion electric energy storage system of the vessel using a combined charging system (CCS).

Galvanic isolation is the process of blocking current flow to prevent a direct conduction path between components or circuits. “Galvanic” refers to metal and the electrochemical process in which one metal corrodes to another when both metals are in electrical contact and in the presence of an electrolyte, but galvanic isolation refers to the absence of metal or a conduction path between components or circuits.

“Low-voltage” is a relative term and should be interpreted as voltages around 24V, such as 12V, 24V, 36V, 48V, etc. Such a voltage is relatively low, when compared to a voltage of a propulsion electric energy storage system of a marine vessel.

The communications module is to be understood as a connector assembly which may be conveniently installed in conventional electric, or hybrid electric, marine vessels in order to galvanically isolate a charging control unit of the marine vessel from the DC electric energy storage system, which powers the charging control unit and other low-voltage consumers of the vessel. The communications module further galvanically isolates communications signals between the charging control and other low-voltage consumers, such as other control units, monitoring units, etc.

The charging control unit may be an electronic control unit (ECU) of the marine vessel and may be arranged to communicate with the on-shore charging station.

Optionally in some examples, including in at least one preferred example, the communications module further comprises a DC/DC buffer configured to be electrically powered by the DC electric energy storage system. The DC/DC buffer may further be configured to supply galvanically isolated electric power to the charging control unit. The communications module further comprises at least one transceiver configured to galvanically isolate communications signals between the charging control unit and the low-voltage consumers. A ground connection of the DC/DC buffer may be connectable to the charging control unit and to a protective earth connection of a combined charging system connector of the marine vessel. A technical benefit may include allowing charging of the propulsion electric energy storage system of the vessel using a combined charging system (CCS) while preventing a corrosion-generating electric current.

The DC/DC buffer may comprise a transformer arrangement for the supply of galvanically isolated (electromagnetically induced) electric power from the DC electric energy storage system, in the form of one or more 24V batteries, to the charging control unit.

Optionally in some examples, including in at least one preferred example, the at least one transceiver comprises at least one of:

- a relay,
- an optoelectrical repeater, and
- 2× optocouplers

Thereby, the galvanic isolation of the communications signals may be achieved using conventional off-the-shelf components. Signal isolation is accomplished by a combination of actions; physical separation and insulating material, combined with a method of isolated signal transmission (magnetic, optical, or capacitive). Regardless of isolation method, galvanic isolation prevents the electrical conduction of unwanted current between circuits, while still allowing a wanted signal to cross an isolation barrier without providing a conductive metal path.

According to a second aspect of the disclosure, there is provided an on-board communications system for a combined charging system (CCS) of a marine vessel. The communications system comprises:

- an on-board combined charging system (CCS) connector comprising a protective earth (PE) connection for electrically connecting the on-board communications system with a protective earth (PE) connection of an on-shore combined charging system (CCS) connector,
- a charging control unit,
- low-voltage consumers,
- a DC electric energy storage system for electrically powering the charging control unit,
- a corrosion protection arrangement, and
- the communications module of any one of the examples of the first aspect of the disclosure.

The charging control unit and the low-voltage consumers are communicatively connected to each other via the at least one transceiver of the communications module, and the DC electric energy storage system is electrically connected to the DC/DC buffer of the communications module. The DC/DC buffer is further configured to supply galvanically isolated electric power to the charging control unit.

The communications system for the combine charging system (CCS) is part of a combined charging system (CCS) configured to charge a propulsion electric energy storage system of a marine vessel. The communications system is configured to collect and communicate data about the status of the charging procedure and is configured to enable or disable the charging procedure depending on the collected and communicated data.

The on-board combined charging system (CCS) connector is configured to physically receive a connector of the on-shore charging system and to electrically connect with the same.

The charging control unit is configured to communicate signals and data with the on-shore charging system and with on-board low-voltage consumers, such as control units, monitoring units, etc.

The DC electric energy storage is configured to supply power to low-voltage consumers of a marine vessel. The DC electric energy storage may comprise one or more batteries, such as one or more 24 V batteries.

The corrosion protection arrangement is a conventional corrosion protection arrangement as exemplified elsewhere in the present disclosure.

Optionally in some examples, including in at least one preferred example, the corrosion protection arrangement comprises a galvanic isolator electrically connected to the protective earth (PE) connection of the on-board combined charging system (CCS) connector. The galvanic isolator is further configured to be electrically connected to a ground connection at a hull of the marine vessel.

Optionally in some examples, including in at least one preferred example, the galvanic isolator is an opto-electronic isolator or a signal transformer. A technical benefit may include prevention of the corrosion-generating stray current.

Optionally in some examples, including in at least one preferred example, the corrosion protection arrangement comprises connection of ground of the DC electric energy storage system to the DC/DC buffer of the communications module. A technical benefit may include galvanically isolating the ground of the DC electric energy storage system from the hull and at the same time enabling connecting the protective earth (PE) connection of the on-board connector to the charging control unit and to ground of the DC/DC buffer.

According to a third aspect of the disclosure, there is provided a marine vessel comprising the on-board communications system of any one of the examples of the second aspect of the disclosure. The third aspect of the disclosure may seek to provide a marine vessel which is enabled to charge its propulsion electric energy storage system using a combined charging system (CCS). The marine vessel may be equipped with a conventional corrosion protection arrangement.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

An object of the present disclosure is to provide a communications module and a communications system comprising the communications module, which enable marine vessels comprising conventional corrosion protection arrangements to use combined charging systems (CCS) for charging of the vessel's propulsion electric or hybrid electric energy storage systems without modifying the existing corrosion protection arrangement of the vessel.

Figure 1:
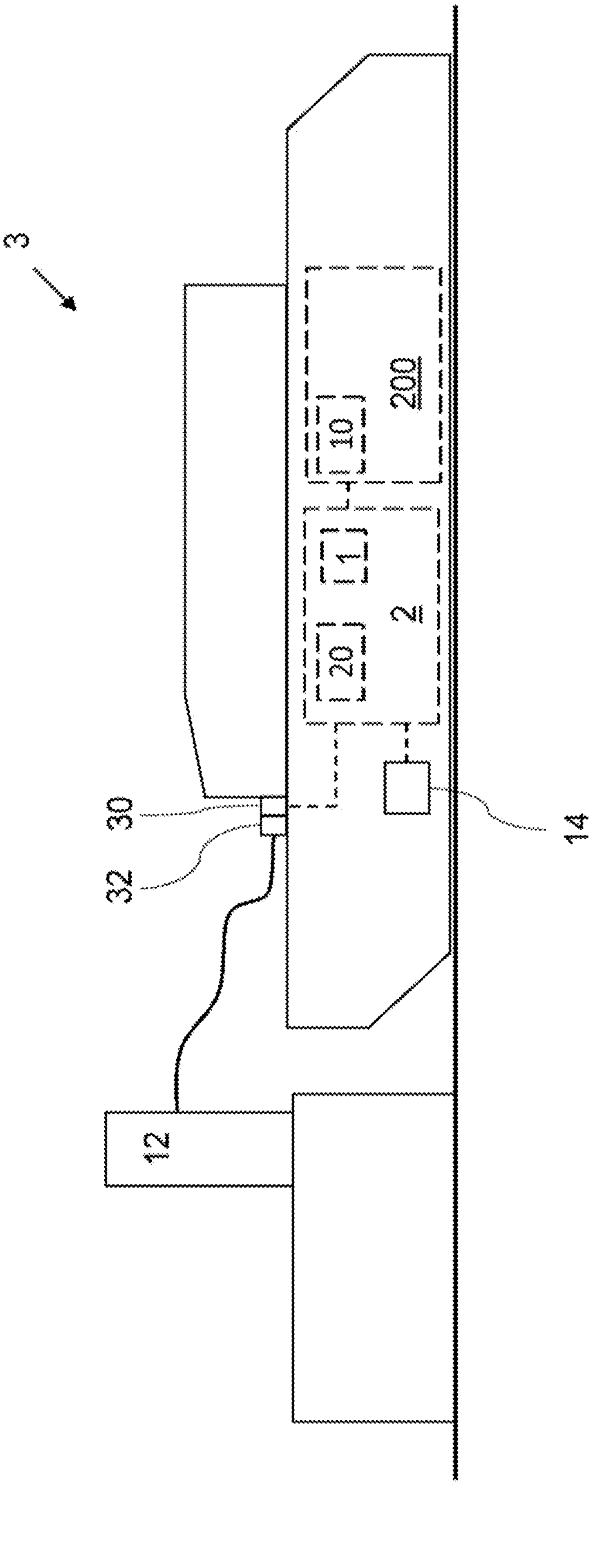
FIG. 1 is an exemplary marine vessel comprising an on-board communications system for a combined charging system (CCS) according to an example.

FIG. 1 shows an exemplary marine vessel 3 according to the third aspect of the disclosure. The marine vessel 3 comprises an on-board communications system 2 according to the second aspect of the disclosure. The communications system 2 comprises a communications module 1 according to the first aspect of the disclosure. The marine vessel 3 further comprises a corrosion protection arrangement 14 to prevent stray currents when the marine vessel is electrically connected to shore-based electric power. FIG. 1 illustrates the shore-based electric power as an on-shore combined charging system (CCS) 12. Electrical connection is achieved by an on-board combined charging system connector 30 physically and electrically connecting with an on-shore combined charging system connector 32.

The connectors 30, 32 of the combined charging system (CCS) comprise communication lines, such as a control pilot (CP) line, a proximity pilot (PP) line and a protective earth (PE) line for communication between a charging control unit 20 of the marine vessel 3 and the on-shore combined charging system. The connectors 30, 32 further comprise pins for charging a propulsion electric energy storage system 10 of a propulsion system 200 of the marine vessel 3.

Figure 2:
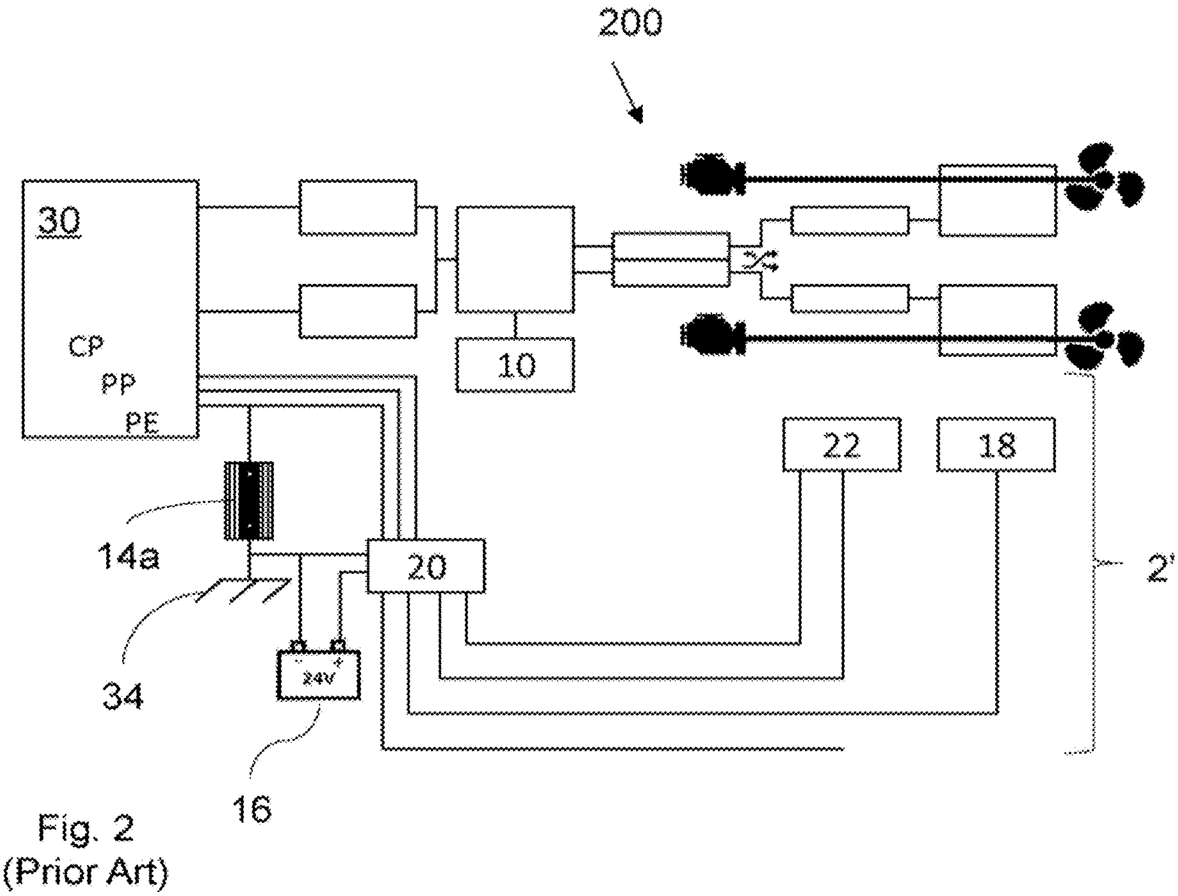
Fig. 2 (Prior Art)
FIG. 2 is an exemplary prior art marine vessel comprising a conventional corrosion protection arrangement, the marine vessel being connected to a combined charging system (CCS).

FIG. 2 shows how a hypothetical communications system 2' for a combined charging system (CCS) might look in a prior art marine vessel 3' equipped with a galvanic isolator 14*a* as corrosion protection. The illustration is "hypothetical" because such a prior art marine vessel 3' would not be provided with an on-board connector 30 is connected to since charging could not start because of the installed corrosion protection 14.

The on-board connector 30 is shown to be electrically connected to the propulsion system 200 and arranged to charge the propulsion electric energy storage system 10. The control pilot (CP) line, the proximity pilot (PP) line and the protective earth (PE) line of the on-board connector 30 are connected to the charging control unit 20. The charging control unit 20 is powered by a DC electric energy storage system, such as a 24V battery, and is further communicatively connected to low-voltage consumers 18, 22, which may be exemplified by a propulsion control unit 22 and/or a traction voltage monitoring unit 18.

It can be seen that the protective earth (PE) line is further connected to a ground connection 34 of the marine vessel's 3' hull via the corrosion protection 14, which is exemplified by a galvanic isolator 14*a*. A ground connection of the DC electric energy storage system 16 for electrically powering low-voltage consumers 18, 20, 22, such as the charging control unit 20, is connected directly to the ground connection 34 of the hull. Therefore, the electric potential at the protective earth (PE) line, as seen by the combined charging system (CCS), would be non-zero, whereas the electric potential of the DC electric energy storage system 16 ground would be zero. Consequently, charging would not start because the electric potential protective earth (PE) differs from the ground connection of the DC electric energy storage system 16.

Figure 3:
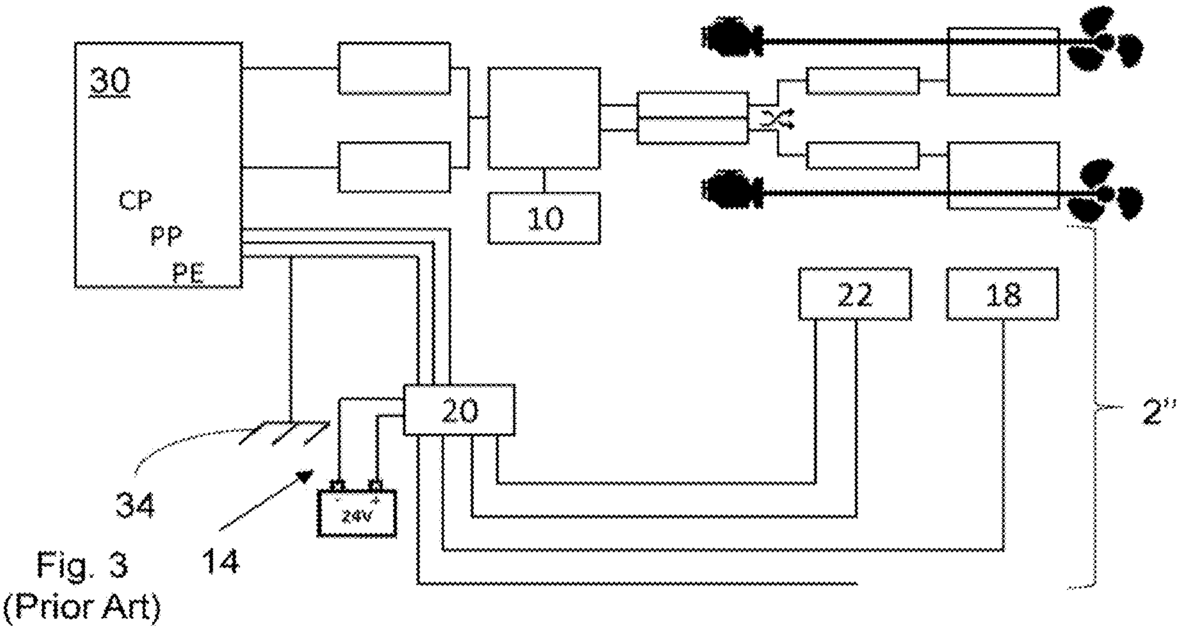
Fig. 3 (Prior Art)
FIG. 3 is a further exemplary prior art marine vessel comprising a conventional corrosion protection arrangement, the marine vessel being connected to a combined charging system (CCS).

FIG. 3 shows yet another prior art marine vessel 3" equipped with a corrosion protection 14 arrangement where the ground of the DC electric energy storage system 16 is separated from the ground connection 34 of the hull of the marine vessel 3".

In a manner similar to the example of FIG. 2, the protective earth (PE) line, which is here connected to the ground connection 34 of the hull, will see a zero electric potential, whereas the ground of the DC electric energy storage system 16 is connected to the charging control unit 20 and will have a different electric potential. Consequently, charging would not start.

Figure 4:
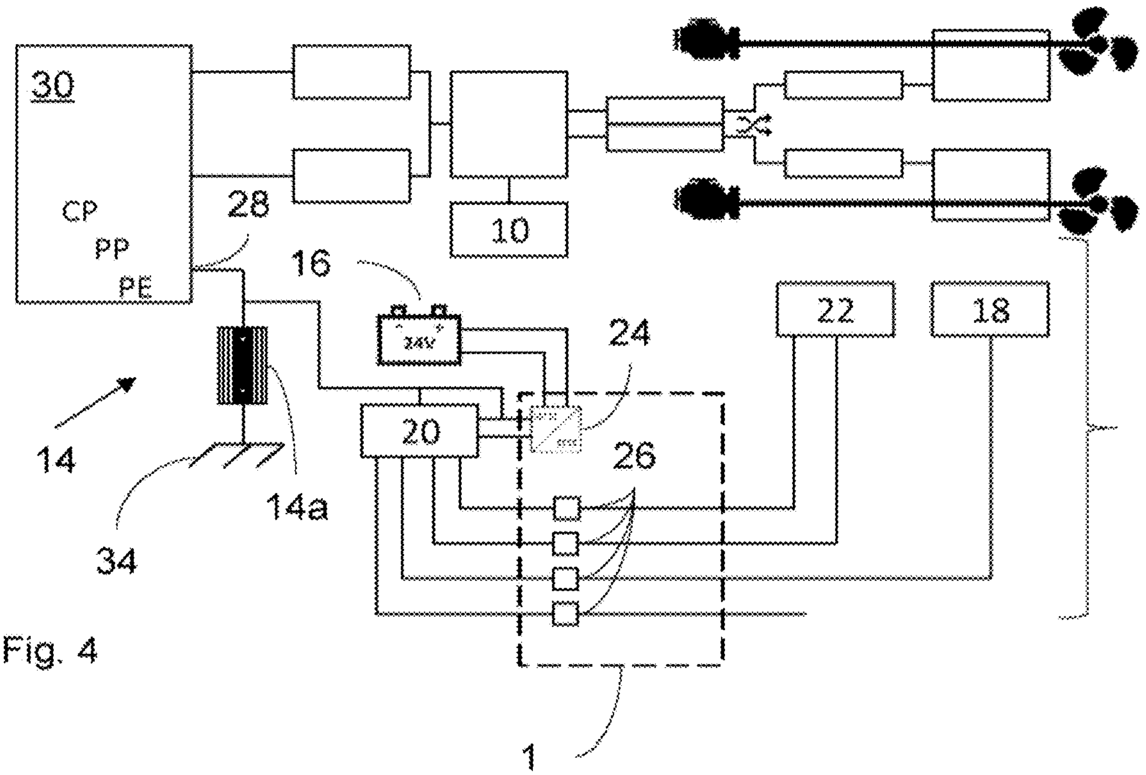
FIG. 4 is an exemplary on-board communications system for a combined charging system (CCS), the on-board communications system comprising a communications module according to an example.

FIG. 4 shows an exemplary on-board communications system 2 according to an example of the present disclosure. The on-board communications system 2 is configured a combined charging system (CCS). The on-board communications system 2 comprises a communications module 1 according to an example of the present disclosure.

The communications module 1 is comprised in the on-board communications system 2 for the combined charging system (CCS) of the marine vessel 3. The communications system 2 comprises:

- the on-board combined charging system (CCS) connector 30 comprising a protective earth (PE) connection for electrically connecting the on-board communications system 2 with a protective earth (PE) connection of an on-shore combined charging system (CCS) connector 32,
- the charging control unit 20,
- low-voltage consumers 18, 22,
- the DC electric energy storage system 16 for (indirectly) electrically powering the charging control unit 20,
- the corrosion protection arrangement 14,
- the communications module 1 as described hereinbelow.

The charging control 20 unit and the low-voltage consumers 18, 22 are communicatively connected to each other via the at least one transceiver 26 of the communications module 1, and the DC electric energy storage system 16 is electrically connected to the DC/DC buffer 24 of the communications module 1. The DC/DC buffer 24 is further configured to supply galvanically isolated electric power to the charging control unit 20.

The on-board communications module 1 is configured to enable charging of the propulsion electric energy storage system 10 of the marine vessel 3 using the on-shore combined charging system (CCS). The marine vessel 3 comprises the corrosion protection arrangement 14 and the communications module 1 is configured to galvanically isolate a charging control unit 20 of the marine vessel 3 from a DC electric energy storage system of the marine vessel 16. The communications module 1 is further configured to galvanically isolate the charging control unit 20 from low-voltage consumers (18, 22) of the marine vessel 3.

The corrosion protection arrangement 14 may be a conventional corrosion protection arrangement as exemplified elsewhere in the present disclosure. The corrosion protection arrangement 14 may comprise a galvanic isolator 14*a* electrically connected to the protective earth (PE) connection of the on-board combined charging system (CCS) connector 30. The galvanic isolator 14*a* is further configured to be electrically connected to the ground connection 34 at the hull of the marine vessel 3. The galvanic isolator 14*a* may be an opto-electronic isolator or a signal transformer, etc.

The corrosion protection arrangement 14 may comprise connection of ground of the DC electric energy storage system 16 to the DC/DC buffer 24 of the communications module 1, thereby galvanically isolating the ground of the DC electric energy storage system 16 from the hull and at the same time enabling connection of the protective earth (PE) connection of the on-board connector 30 to the charging control unit 20 and to ground of the DC/DC buffer 24.

A ground signal of the charging control unit 20 of the marine vessel 3, is configured to match the protective earth (PE) signal as seen by the on-board connector 30 of the combined charging system (CCS) while at the same time preventing a stray current which could lead to corrosion. In this manner, electric, or hybrid electric marine vessels 3, equipped with conventional corrosion protection arrangements 14, will be enabled to charge the propulsion electric energy storage system 10 of the marine vessel 3 using the combined charging system (CCS).

As stated hereinabove, galvanic isolation is the process of blocking current flow to prevent a direct conduction path between components or circuits. "Galvanic" refers to metal and the electrochemical process in which one metal corrodes to another when both metals are in electrical contact and in the presence of an electrolyte, but galvanic isolation refers to the absence of metal or a conduction path between components or circuits.

The communications module 1 may be a connector assembly which may be mounted on a frame and enclosed in a box, which may in turn be conveniently installed in an electric, or hybrid electric, marine vessel 3 in order to galvanically isolate the charging control unit 20 of the marine vessel 3 from the DC electric energy storage system 16, which powers the charging control unit and other low-voltage consumers 18, 22 of the marine vessel 3. The communications module 1 further galvanically isolates communications signals between the charging control unit 20 and the other low-voltage consumers 18, 22, such as other control units 22, monitoring units 18, etc.

The charging control unit 20 may be an electronic control unit (ECU) of the marine vessel 3 and may be arranged to communicate with the on-shore combined charging system 12 shown in FIG. 1.

The communications module 1 may further comprises a DC/DC buffer 24 configured to be electrically powered by the DC electric energy storage system. The DC/DC buffer may further be configured to supply galvanically isolated electric power to the charging control unit. The communications module further comprises at least one transceiver 26 configured to galvanically isolate communications signals between the charging control unit 20 and the low-voltage consumers 18, 22. A ground connection of the DC/DC buffer 24 may be connectable to the charging control unit 20 and to the protective earth (PE) connection of the combined charging system connector 30 of the marine vessel 3. Thereby, charging of the propulsion electric energy storage system 10 of the marine vessel 3, using a combined charging system (CCS), is enabled while at the same time preventing a corrosion-generating electric current. The charging process is enabled because the protective earth (PE) signal equals the ground signal of the DC electric energy storage system 16, which is shown to the combined charging system (CCS) as the ground signal of the DC/DC buffer 24.

The DC/DC buffer 24 may for instance comprise a transformer arrangement for the supply of galvanically isolated (such as electromagnetically induced) electric power from the DC electric energy storage system 16, which may be exemplified by one or more 24V batteries, to the charging control unit 20.

The at least one transceiver 26 may be exemplified as at least one of a relay, an optoelectrical repeater, and 2× optocouplers, etc. Thereby, galvanic isolation of the communications signals may be achieved using conventional off-the-shelf components. In general, signal isolation is accomplished by a combination of actions, i.e. physical separation and insulating material, combined with a method of isolated signal transmission (magnetic, optical, or capacitive). Regardless of isolation method, galvanic isolation prevents electrical conduction of unwanted current between components or circuits, while still allowing a wanted signal to cross an isolation barrier without providing a conductive metal path.

The communications system 2 for the combine charging system (CCS) is part of an on-board combined charging system (CCS) configured to charge a propulsion electric energy storage system 10 of the marine vessel 3. The communications system 2 is configured to, via the charging control unit 20, collect and communicate data about the status of the charging procedure and/or about the status of the marine vessel 3 as a whole, including status of sub-components such as low-voltage consumers 18, 22 and the propulsion electric energy storage system 10. The communications system 2 and is further configured to enable or disable the charging procedure depending on the collected and communicated data.

The on-board combined charging system connector 30 is configured to physically receive a connector 32 of the on-shore combined charging system and to electrically connect with the same.

The charging control unit 20 is configured to communicate signals and data with the on-shore combined charging system 12 and with on-board low-voltage consumers 18, 22, such as control units, monitoring units, etc.

The DC electric energy storage system 16 is configured to supply power to the low-voltage consumers 18, 22 of the marine vessel 3. The DC electric energy storage system 3 may comprise one or more batteries, such as one or more 24 V batteries.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. An on-board communications module configured to enable charging of a propulsion electric energy storage system of a marine vessel using an on-shore combined charging system, and where the marine vessel comprises a corrosion protection arrangement, the communications module being configured to galvanically isolate a charging control unit of the marine vessel from a DC electric energy storage system of the marine vessel, the communications module further being configured to galvanically isolate the charging control unit from low-voltage consumers of the marine vessel.

2. The on-board communications module of claim 1 further comprising:

a DC/DC buffer configured to be electrically powered by the DC electric energy storage system, the DC/DC buffer further being configured to supply galvanically isolated electric power to the charging control unit, at least one transceiver configured to galvanically isolate communications signals between the charging control unit and the low-voltage consumers, and wherein a ground connection of the DC/DC buffer is connectable to the charging control unit and to a protective earth connection of a combined charging system connector of the marine vessel.

3. The on-board communications module of claim 2, wherein the at least one transceiver is configured to relay communications signals comprising at least one of:

controller area network signals, hazardous voltage interlock loop signals, a key switch ignition ON signal, and any hardwired 8-32V communications signals.

4. The on-board communications module of claim 2, wherein the at least one transceiver comprises at least one of:

a relay, an optoelectrical repeater, and

2× optocouplers.

5. An on-board communications system for a combined charging system of a marine vessel, the communications system comprising:

an on-board combined charging system connector comprising a protective earth connection for electrically connecting the on-board communications system with a protective earth connection of an on-shore combined charging system connector, a charging control unit, low-voltage consumers a DC electric energy storage system for electrically powering the charging control unit, a corrosion protection arrangement, and the communications module of claim 1, and wherein the charging control unit and the low-voltage consumers are communicatively connected to each other via the at least one transceiver of the communications module, and wherein the DC electric energy storage system is electrically connected to the DC/DC buffer of the communications module, the DC/DC buffer further being configured to supply galvanically isolated electric power to the charging control unit.

6. The on-board communications system of claim 5, wherein the low-voltage consumers comprise at least one of:

a control unit, and a monitoring unit.

7. The on-board communications system of claim 5, wherein the corrosion protection arrangement comprises a galvanic isolator electrically connected to the protective earth connection of the on-board combined charging system connector, and which galvanic isolator is further configured to be electrically connected to a ground connection at a hull of the marine vessel.

8. The on-board communications system of claim 7, wherein the galvanic isolator is an opto-electronic isolator or a signal transformer.

9. The on-board communications system of claim 5, where the corrosion protection arrangement comprises connection of ground of the DC electric energy storage system to the DC/DC buffer of the communications module.

10. A marine vessel comprising the on-board communications system of claim 5.

* * * * *